No. 731,870. PATENTED JUNE 23, 1903.
F. G. ECHOLS.
INDEXING MECHANISM.
APPLICATION FILED AUG. 25, 1902.
NO MODEL. 8 SHEETS—SHEET 4.
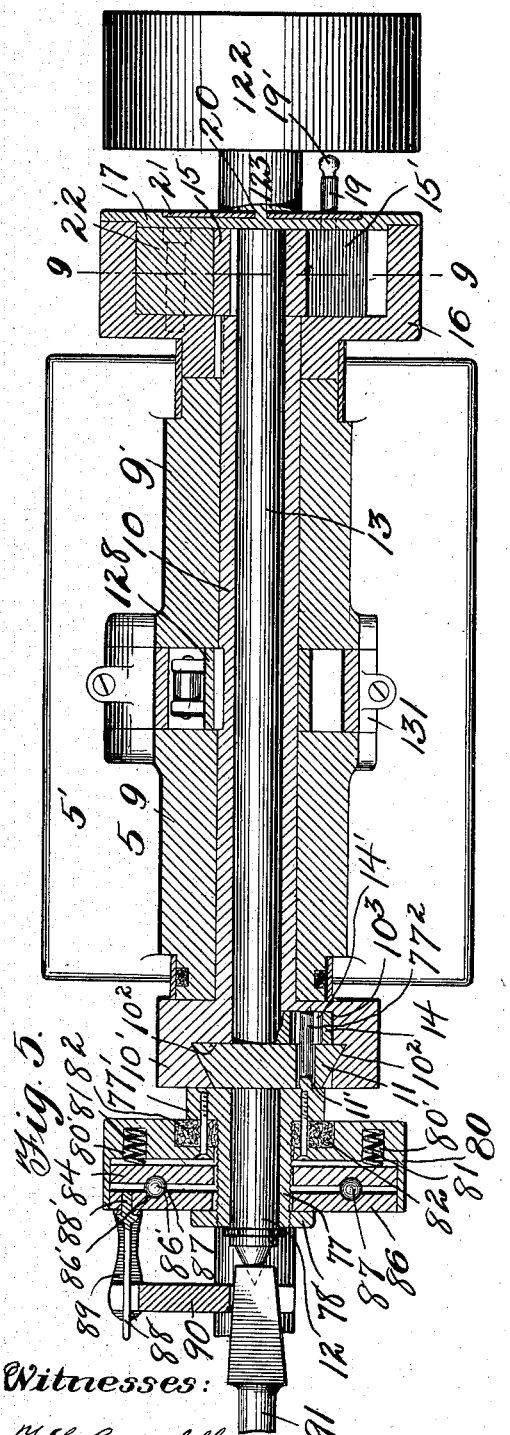
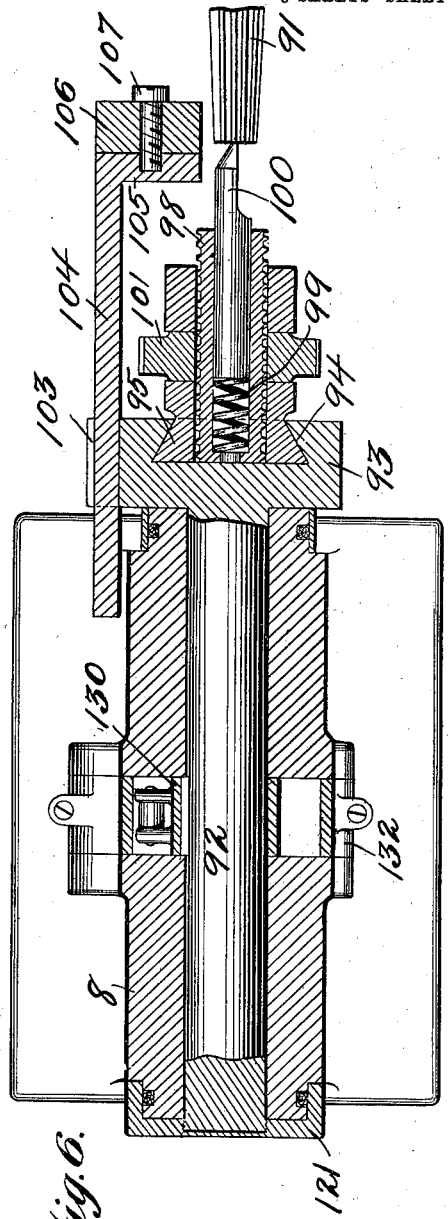
Witnesses:
F. G. Campbell.
Frances E. Blodgett.
Inventor:
Francis G. Echols:
By his Attorneys
Blodgett & Pick

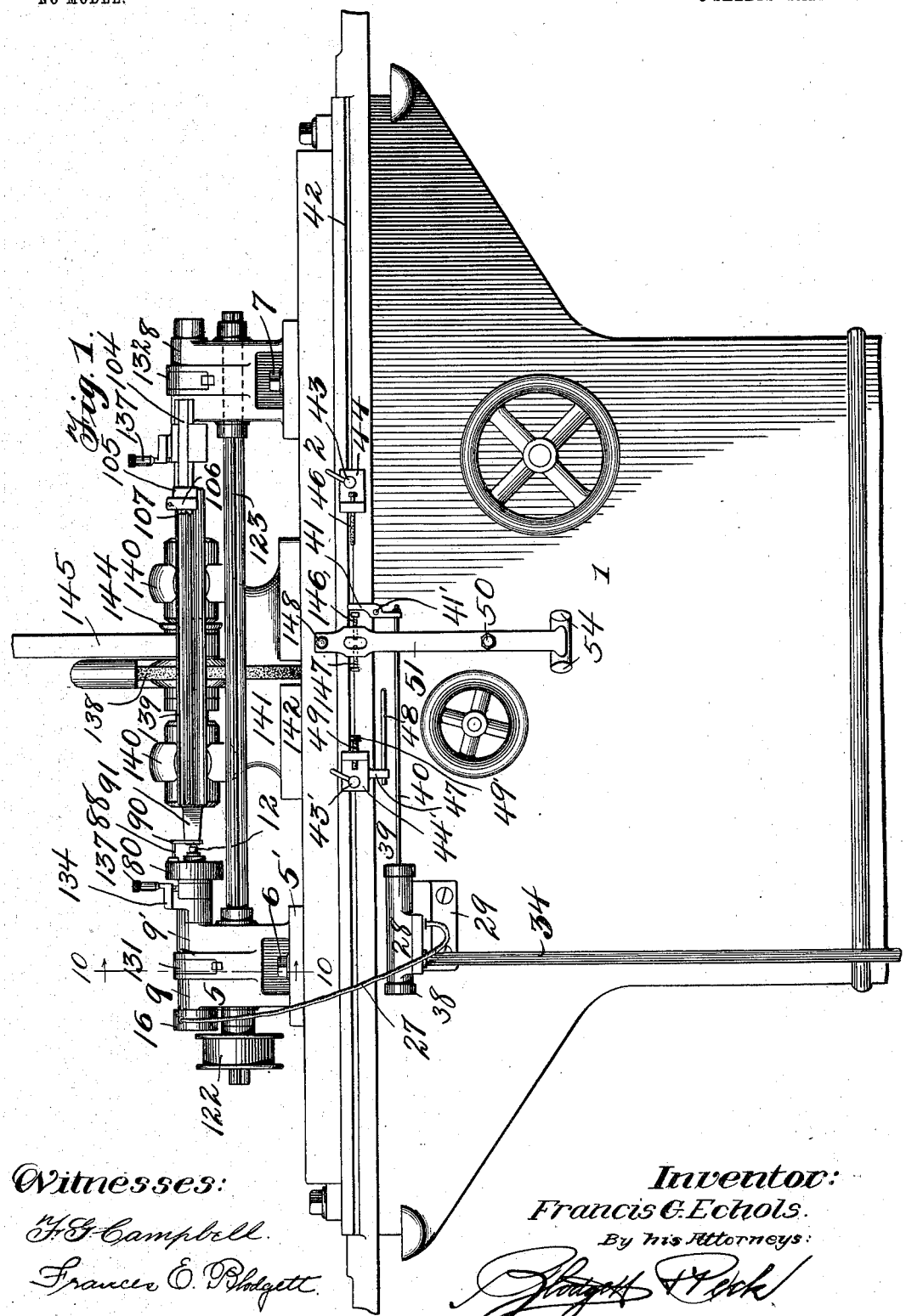

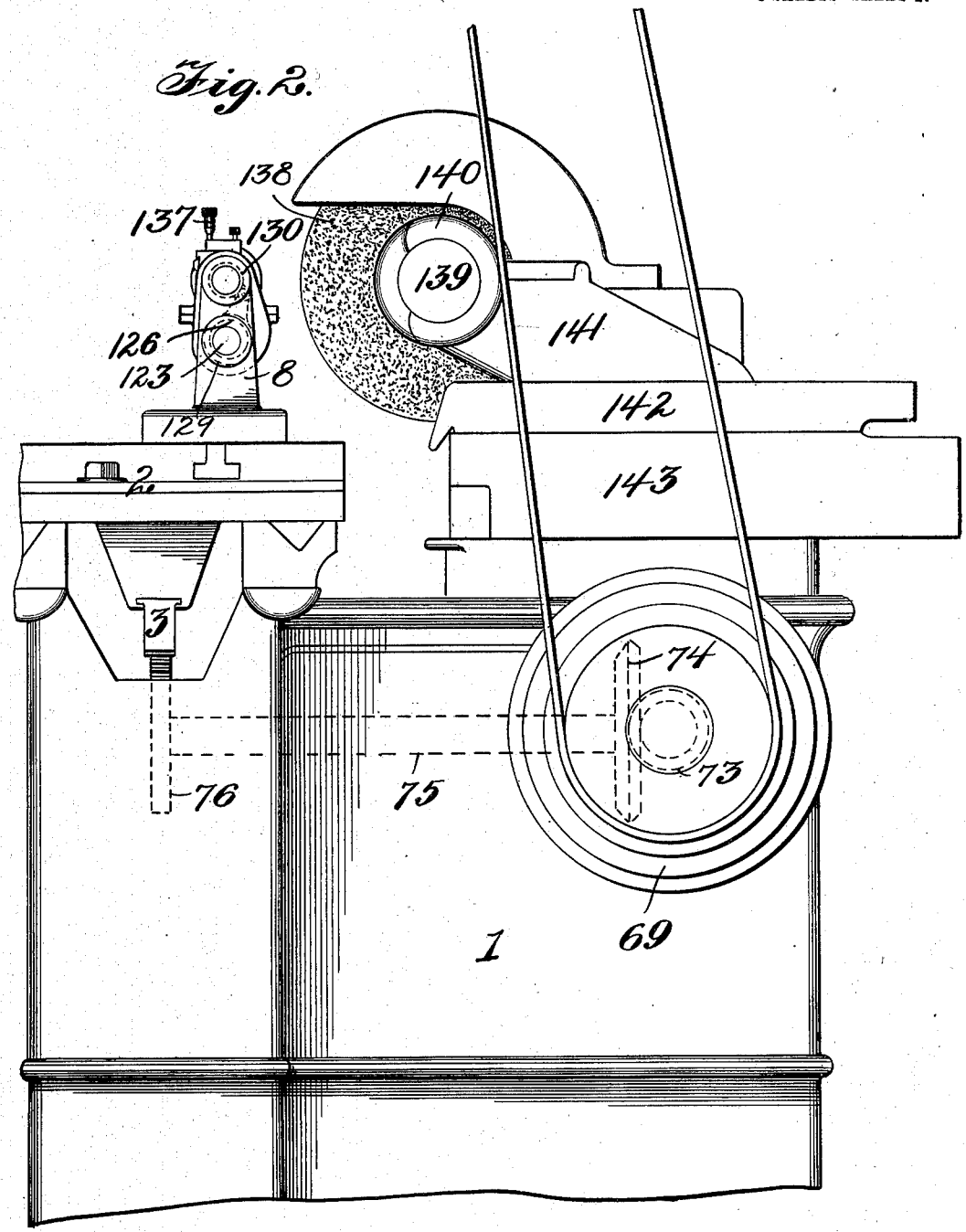

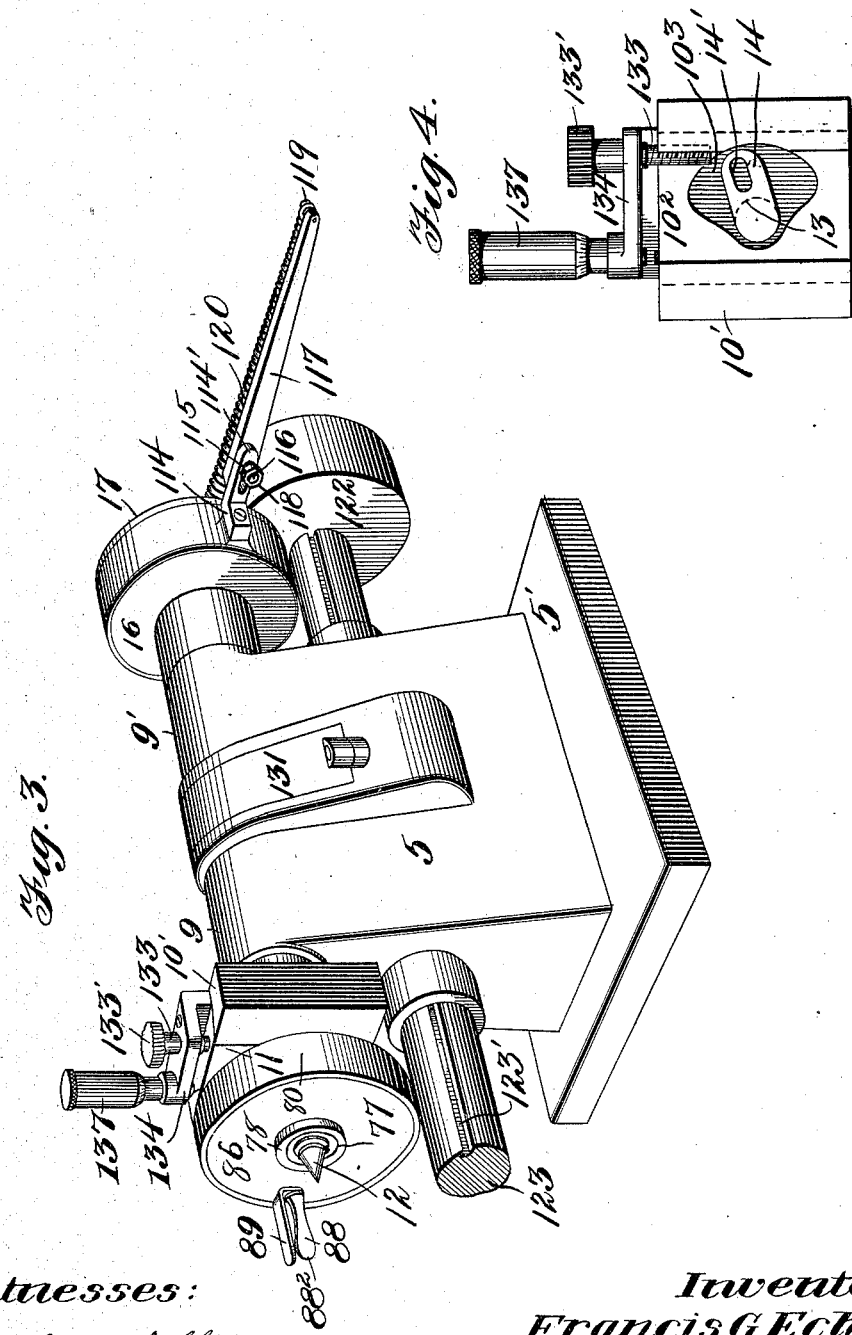

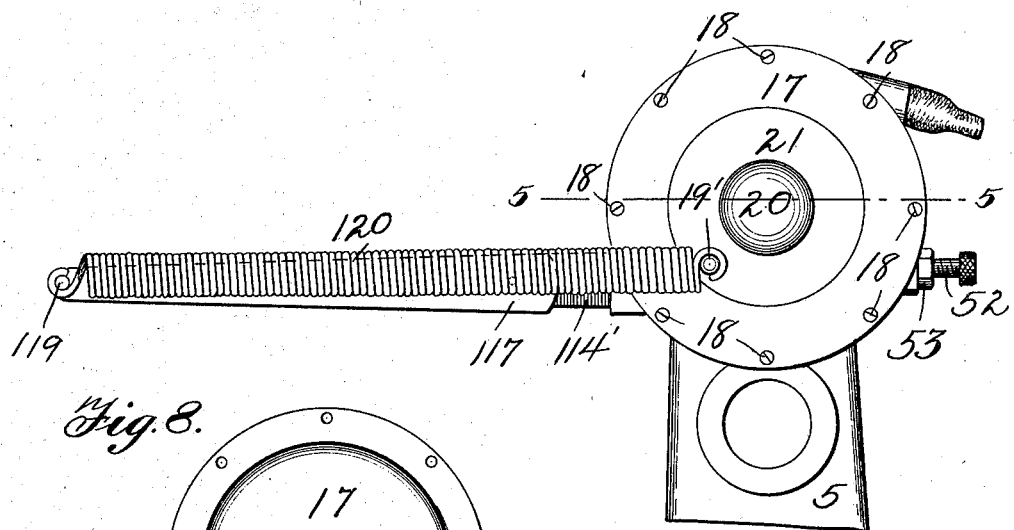
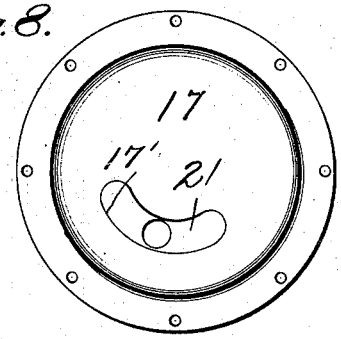
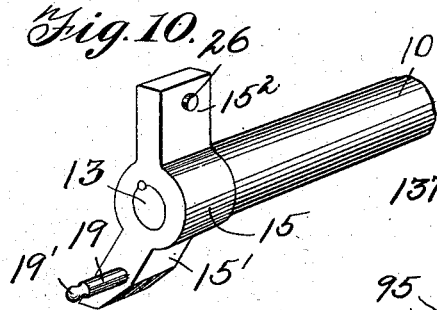
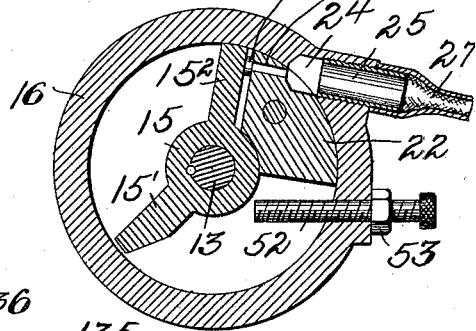
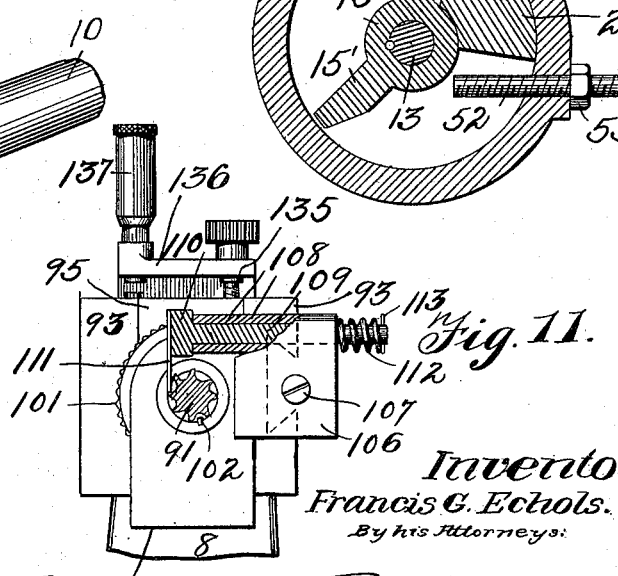

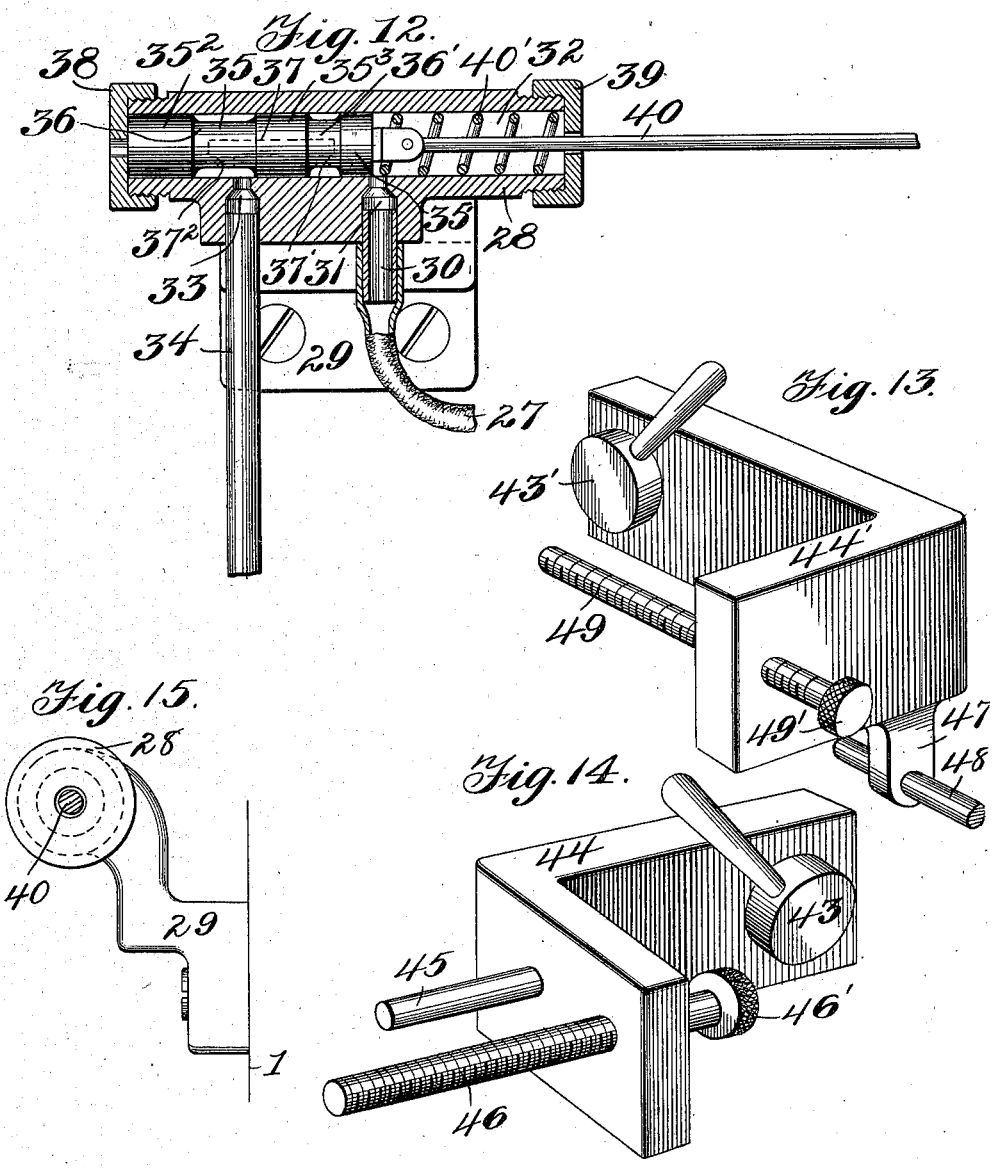

No. 731,870. PATENTED JUNE 23, 1903.
F. G. ECHOLS.
INDEXING MECHANISM.
APPLICATION FILED AUG. 25, 1902.
NO MODEL. 8 SHEETS—SHEET 7.
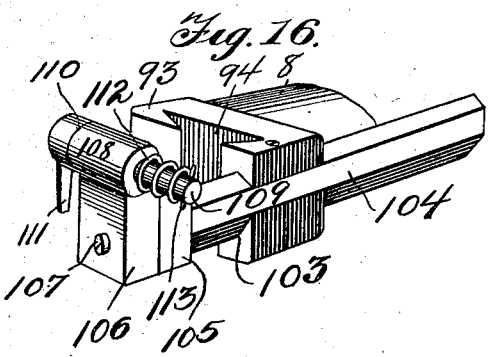
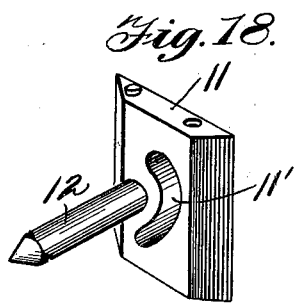
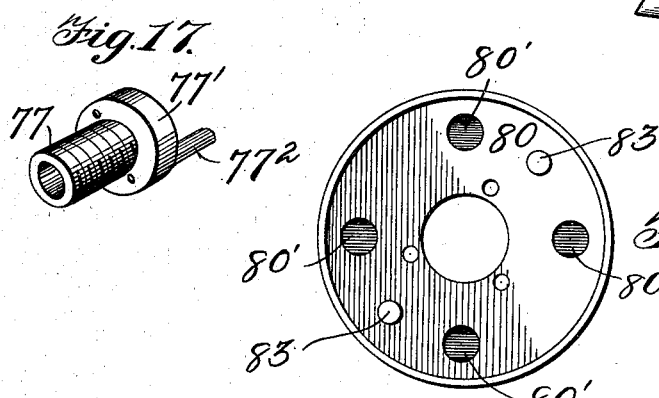
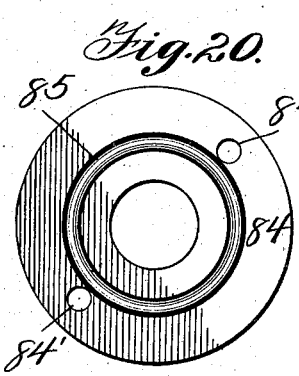
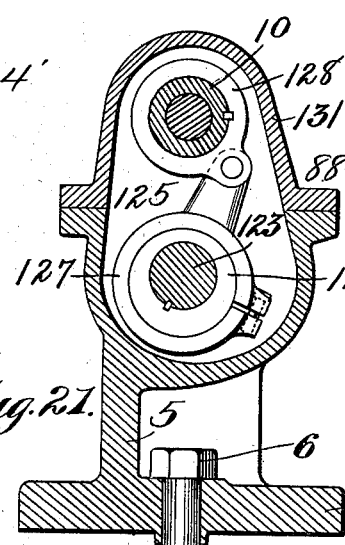
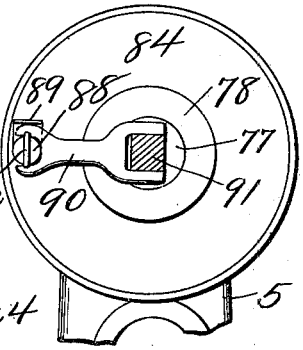
Witnesses:
W. F. Campbell.
Frances E. Blodgett.
Inventor:
Francis G. Echols.
By his Attorneys.

No. 731,870. PATENTED JUNE 23, 1903.
F. G. ECHOLS.
INDEXING MECHANISM.
APPLICATION FILED AUG. 25, 1902.
NO MODEL. 8 SHEETS—SHEET 8.
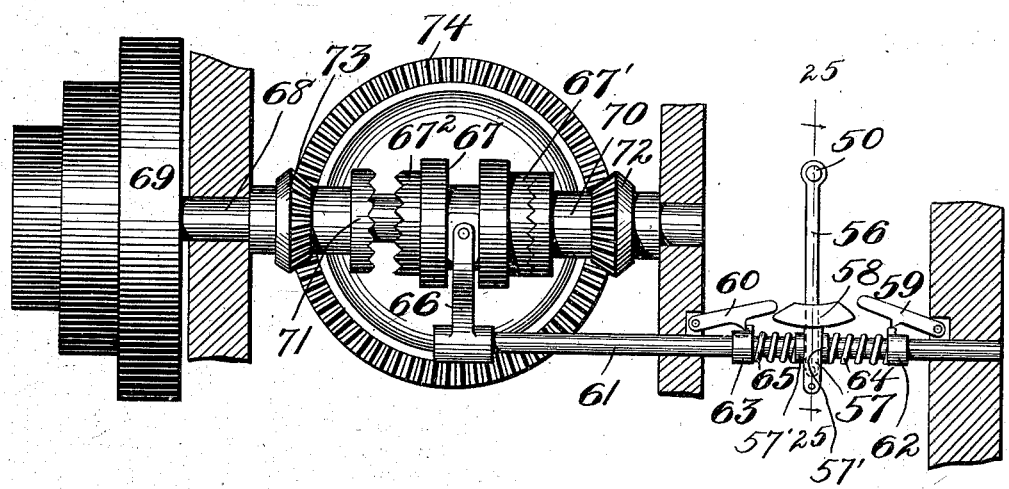
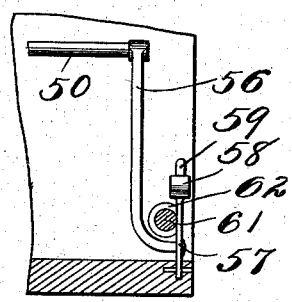
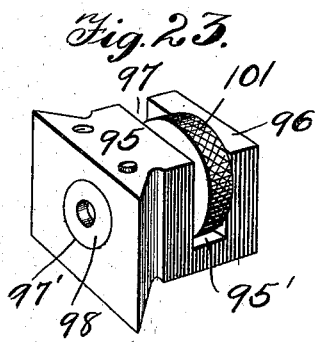
Witnesses:
F. G. Campbell.
Frances E. Blodgett.
Inventor:
Francis G. Echols:
By his Attorneys.
Blodgett & Peck No. 731,870. Patented June 23, 1903.

UNITED STATES PATENT OFFICE.

FRANCIS G. ECHOLS, OF HARTFORD, CONNECTICUT, ASSIGNOR TO PRATT & WHITNEY COMPANY, OF HARTFORD, CONNECTICUT, A CORPORATION OF NEW JERSEY.

INDEXING MECHANISM.

SPECIFICATION forming part of Letters Patent No. 731,870, dated June 23, 1903.

Application filed August 25, 1902. Serial No. 120,953. (No model.)

*To all whom it may concern:*

Be it known that I, FRANCIS G. ECHOLS, a citizen of the United States, residing at Hartford, in the county of Hartford and State of Connecticut, have invented certain new and useful Improvements in Indexing Mechanism, of which the following is a specification.

My invention relates to indexing mechanism.

It has for its object improvements in mechanism of the kind specified whereby the work will be accomplished expeditiously and accurately, as will be hereinafter described.

A further object of the invention is the provision of fluid-actuated means for automatically indexing the work and in connection with said means devices for returning said work to its proper position should it be turned too far by the indexing mechanism.

Other objects of the invention will be set forth in the detailed description which now follows.

In the accompanying drawings, Figure 1 is a side elevation of a machine for relieving fluted tools with my invention applied thereto. Fig. 2 is an end view of said machine, the relieving-tool being shown out of contact with the work. Fig. 3 is a perspective view of the head in which the devices for carrying one of the centers are mounted. Fig. 4 is a view in elevation of a recessed guide-block carried by a tubular shaft journaled in the head shown in Fig. 3 and an end view of a crank projecting from a rotary shaft mounted in said tubular shaft. Fig. 5 is a horizontal section of the head and parts thereof illustrated in Fig. 3, taken on line 5 5 of Fig. 7. Fig. 6 is a horizontal section of the head carrying the dead-center. Fig. 7 is a right-hand end view of the devices illustrated in Fig. 3. Fig. 8 is a plan view of one of the end plates of Fig. 7. Fig. 9 is a transverse section taken on line 9 9 of Fig. 5. Fig. 10 is a perspective view of the indexing-piston and a part of the shaft to which it is secured. Fig. 11 is an end view of the head carrying the dead-center, showing in section the tool-blank and the stop devices for determining its position after an indexing operation has taken place. Fig. 12 is a vertical section of the valve-chamber, the valve being in elevation and a portion of the valve-actuating rod being represented. Figs. 13 and 14 are respectively perspective views of stops for operating the valve-actuating devices upon the termination of each stroke of the carriage. Fig. 15 is an end view of the valve-chamber, showing the bracket for supporting it. Fig. 16 is a perspective view of a portion of the head in which the slide carrying the dead-center is mounted, showing the slide-bar to which the stop devices are secured. Fig. 17 is a detail perspective view of a crank-sleeve hereinafter described. Fig. 18 is a detached perspective view of the head-center and the slotted slide to which it is secured. Figs. 19 and 20 are respectively plan views of the flanged carrier and one of the friction-disks of the indexing mechanism. Fig. 21 is a transverse section on line 10 10 of Fig. 1 of the stock carrying the head-center looking in the direction of the arrow. Fig. 22 is a front view of part of the indexing mechanism, the shank of the tool-blank being in section. Fig. 23 is a detail view of the slide in which the dead-center is adjustably mounted. Fig. 24 is a view of one form of reversing mechanism that may be employed for driving the shaft carrying the pinion engaging the rack on the carriage; and Fig. 25 is a detail sectional view of part of said mechanism hereinafter described, taken on line 25 25 of Fig. 24.

Like numerals designate similar parts throughout the several views.

Referring to the drawings, the numeral 1 designates a suitable framework or sustaining-bed upon which a carriage 2 is supported for longitudinal movement by any desired means—as, for instance, a pinion to which power may be applied, as hereinafter described, and a rack 3 upon the carriage 2, as shown in Fig. 2.

Mounted in any desired way upon the carriage or slide 2 is a head-stock 5, the base 5' of which may be adjustably secured in position by suitable means—as, for instance, a bolt 6—and also adjustably secured to said carriage by a bolt or other device 7 is a tailstock 8.

In bearings 9 9' of the head-stock 5 is journaled a tubular shaft 10, having a head 10' at its forward end, said head being provided with a guideway $10^2$ in its face and being recessed at $10^3$ (see Fig. 4) for a purpose hereinafter stated. Fitted in the guideway $10^2$ of this head 10' is a slide 11, (shown detached in Fig. 18,) carrying the head-center 12, said slide having an arcuate slot 11' for the reception of a wrist-pin, hereinafter described.

Mounted in the bore of shaft 10 is a shaft 13, carrying a crank 14 at one end, said crank being slotted at 14', as shown in Fig. 4, and to the opposite end of said shaft is secured by a spline or otherwise a hub 15, having wings or vanes 15' $15^2$, the latter acting as a piston. Secured to the tubular shaft 10, at its end opposite the head 10', is a chambered head 16, in which said wings 15' $15^2$ are mounted, and this head is closed on its exterior by a cap-plate 17, secured thereto by screws 18, as illustrated in Figs. 7 and 8, said cap-plate having a curved slot 17'. A screw 52, provided with a jam-nut 53, limits the movement of sleeve 15 and its vanes. Projecting from the wing or vane 15' is a pin 19, having a head 19', and mounted for oscillatory movement upon the shank of a headed stud 20 of cap-plate 17 is a plate 21, perforated to receive the pin 19 and preferably seated in a recess of plate 17, as shown in Figs. 5 and 7. Secured to the inner wall of the chambered head 16 is an abutment 22, provided with a passage 23, the latter opening into a chamber 24 of said head, in which is fitted a nipple 25, and carried by the vane $15^2$, which is an oscillatory piston, is a projection 26, the latter normally closing said passage, as illustrated in Fig. 9. Sleeved upon the nipple 25 is the end of a flexible tube 27, leading to a valve-chamber 28, shown mounted upon a bracket 29, secured to the bed 1, said valve-chamber having a nipple 30, upon which the other end of the flexible tube is slipped, as illustrated in Fig. 12. In the valve-chamber 28 is a port 31, communicating with the nipple 30 and with a longitudinal passage 32 of said chamber, and a port 33, in which is inserted the end of a pipe 34, leading to a suitable source of pressure—for instance, a compressed-air tank. (Not shown.)

Fitted for reciprocatory movement in the passage 32 of the valve-chamber 28 is a valve 35, having heads 35' $35^2$ and an enlargement $35^3$ intermediate of and of the same diameter as said heads, the heads and enlargement snugly fitting the bore of the valve-chamber, as shown in Fig. 12.

Between the heads and the enlargement just described the body of the valve is reduced at 36 36' and is provided with a central passage 37, having ports 37' $37^2$, as illustrated by dotted lines in said Fig. 12. At its outer end the valve-chamber has threaded thereon a perforated cap 38, and a similar closure 39 is in threaded engagement with the inner end of said chamber, said closure being perforated to receive a rod 40, secured at one end to the valve and at its opposite extremity to the lower arm of a lever 41, pivoted at 41' to the bed. A spring 40' is located in the valve-chamber and serves to return the valve to the normal position shown in Fig. 12.

At its front the carriage 2 is provided with a longitudinal T-shaped slot 42 for the reception of nuts (not shown) in which lever-screws 43 43' are inserted, said screws serving to secure stop-brackets 44 44' adjustably to said carriage. These brackets are preferably of angular form, as shown in Figs. 13 and 14, and projecting from the bracket 44 is a pin 45 and a screw 46, having a knurled head 46', said screw being threaded into the lateral arm of the bracket. Depending from the stop-bracket 44' is a lug 47, perforated to receive a pin 48, and also threaded into the lateral arm of this bracket is a screw 49, having a knurled head 49' to afford a convenient grasping-surface. It will be noticed that the pin 45 and screw 46 are located in the same horizontal plane in the arm of the stop-bracket 44, while in bracket 44' the pin 48 is diagonally below the screw 49, and the object of this arrangement will presently appear.

Secured to the end of a shaft 50, journaled in the machine-bed 1, is a lever 51, the lower extremity of which is received between a pair of lugs 54, which limit its motion, and upon the other end of this shaft on the rear side of the bed is secured an arm 56, and to this arm is attached a pivoted lever 57, actuating a sleeve 57', the lever 57 having a bevel-ended shoe 58. (See Figs. 24 and 25.)

Pivoted to the frame are detents 59 and 60, and passing through the sleeve 57' is a rod 61, provided with collars 62 and 63, having lugs adapted to engage the noses of the detents. Surrounding the rod 61 and located between the collars thereon and the ends of the sleeve 57' are spiral springs 64 and 65, and connected to the end of the rod is a clutch-shifting yoke 66, fitted in a groove of a sliding clutch 67, having clutch-faces 67' $67^2$. Designated by 68 is the main driving-shaft, carrying a pulley 69, to which power may be applied by a belt, upon which said clutch is splined, and loosely mounted upon the shaft are clutch-sleeves 70 and 71, carrying bevel-gears 72 and 73 in engagement with a large bevel-gear 74, as shown in Fig. 24, said gear 74 being carried by a shaft 75, having a pinion 76 meshing with the rack 3 of carriage 2, as shown by dotted lines in Fig. 2. This stopping and reversing mechanism constitutes no part of the present invention, and other mechanisms for accomplishing the same result may be substituted therefor, if desired.

Referring now to Figs. 3, 5, and 17, the numeral 77 designates a sleeve loosely surrounding the head-center 12, said sleeve having a flange 77' at its inner end and being externally threaded to receive a nut 78. Projecting from the flange 77' of this sleeve is a wrist-pin $77^2$, which passes through the curved slot 11' of the head-center slide 11 and enters the slot 14' of the crank 14 of shaft 13, by which it is actuated. Fitted over the sleeve and secured by screws 79 or otherwise to the flange 77' thereof is a circular flanged plate 80, having recesses 80' to receive spiral springs 81, said plate being also recessed on the inner side of its base for the reception of dust-excluding packing 82 and also carrying projecting pins 83. (See Fig. 19.) Fitted over the sleeve and located in the flanged part of the plate 80 is a disk 84, perforated at 84' to receive the pins 83 and preferably provided with a ball-raceway 85, although said raceway may be omitted, if desired. Also loosely surrounding the sleeve 77, in juxtaposition to the disk 84, is a second disk 86, preferably having a ball-raceway 86', and located in these raceways when employed are balls 87. By adjusting the nut 78 the disk 86 may be forced against the disk 84, thereby compressing the springs 81 and engendering sufficient friction between the parts to cause the disk 86 to turn with the disk 84 when the sleeve 77 is actuated by the crank 14. Projecting from the outer face of the disk 86 is an arm 88, having a shank 88' threaded into a seat in said disk and a spring 89. This spring overlaps the edge of the arm, as shown in Figs. 3 and 5, and said edge is concave for the greater part of its length and terminates in an enlarged and rounded tip or end $88^2$.

Designated by 90 is a lathe-dog, the shank of which is held between the concave part of said arm and the spring, said dog being slotted at its opposite end to embrace the shank of the tool-blank 91, as shown in Fig. 22.

Within a bore of the head 8 is mounted a shaft 92, having a head 93, provided with a guide-groove 94, in which is fitted a dovetailed slide 95, and from this slide projects a horizontal arm 95', having a vertical extension 96 separated from its other part to leave a space 97 for a purpose hereinafter stated. Longitudinally this slide is perforated at 97' to receive an externally-threaded tubular carrier 98, in which a spring 99 and a dead-center 100, bearing against said spring, are located, (see Figs. 6 and 23,) and in the space 97 of said slide is a nut 101, through which the carrier 98 passes. This center 100 sustains the rear end of the blank and is what is technically known as a "pump-center," and while having a yielding support in the carrier is prevented from rotating therein by a spline 102, as shown in Fig. 11.

In one side of the head 93 of shaft 92 is a slot 103, preferably of dovetail shape, as illustrated in Fig. 16, and fitted in this slot is a bar 104, having a head 105, to which a plate 106 is secured by a screw 107, said plate having a bearing 108, in which is fitted a rod 109, provided with a head 110, carrying a yielding finger or spring-stop 111. A spring 112 surrounds this rod, as shown in Fig. 16, and engages the bearing at one of its ends and a pin 113 of the rod at its opposite extremity. This construction is important when tool-blanks of comparatively large diameter are to be indexed, for, as will be obvious, greater strain will be thrown upon the finger 111 in such cases, and to permit this finger to yield and then snap behind a tooth or projection of the blank the sliding rod 109 and spring 112 are provided, the rod moving against the tension of the spring, and said spring thus aiding in causing the finger to resume its position behind the tooth.

Secured to the chambered head 16 is an angular bracket 114, the projecting arm 114' of which is slotted at 115 to receive a screw 116, projecting from a bar 117, whereby said bar may be adjustably retained in place upon the bracket by a nut 118. Connected at one end to a pin 119 of the bar 117 and at its opposite end to the head 19' of pin 19, projecting from vane 15', is a spring 120. This pin 19 passes through the oscillatory cover-plate 21 and the curved slot 17' of the recessed plate 17 and enters the vane 15', as above stated, and should the tool-blank be "indexed" too far it will after the fluid-pressure supply to chamber 16 is shut off immediately reverse the movement of said blank until its next rib or "land" is brought against the yielding stop 111, as shown in Fig. 11.

Attached to the rear end of shaft 92 is a flanged cap 121, the flange of this cap overlapping the end of head 8, as shown in Fig. 6.

Driven by a belt on a pulley 122 is a shaft 123, having a longitudinal groove 123', and this shaft is journaled in bearings of the head-stock 5 and tail-stock 8, as illustrated in Fig. 1, and carries an eccentric 124, located in a chamber 125 of the head-stock 5, and an eccentric 126, (see dotted lines, Fig. 2,) disposed in a similar chamber of the tail-stock 8, each of said eccentrics being splined to said shaft, so that it may slide longitudinally thereof when the heads carrying the centers are adjusted upon the carriage 2 to suit the length of blank the lands of which are to be relieved. Surrounding eccentric 124 is a strap 127, which is articulated to a strap 128, splined to the tubular shaft 10, as illustrated in Fig. 21, and embracing eccentric 126 is a similar strap 129, articulated to a crank-strap 130, splined to the shaft 92 in tail-stock 8, as shown in Fig. 6 and by dotted lines in Fig. 2.

In virtue of the construction just described it will be seen that the shafts 92 and 10 are given a simultaneous rocking or oscillatory movement when the shaft 123 is rotated and through the connections above described impart a corresponding movement to the tool-blank.

For covering the shafts 10 and 92 caps 131 132 are bolted to the chambered offsets of stocks 5 and 8.

For adjusting the slide 11, carrying head-center 12, is a screw 133, which is tapped into the top of the slide, and this screw is provided with a knurled head 133', and its shank is mounted in the arm of a bracket 134. A similar screw 135 is tapped into the end of slide 95, said screw being mounted in the arm of a bracket 136 of tail-stock 8. For obtaining a micrometric adjustment of these slides verniers 137 are carried by said brackets, and these act as adjustable stops, which may be set to determine the exact positions of the slides necessary properly to locate the centers 12 and 100 to sustain the tool-blank in the required position relatively to the relieving-tool.

In Figs. 1 and 2 I have shown the relieving-tool as a disk 138, of emery or corundum, although tools of other kinds and made of different materials may be substituted therefor, if desired, said disk being carried by a shaft 139, journaled in bearings 140 of a support 141, rising from a slide 142, adapted to be adjusted to locate the relieving-tool properly with reference to the tool-blank in the ways of pivoted support 143 by a screw or other well-known means. (Not shown.) Shaft 139 is shown in Fig. 1 as carrying a pulley 144, driven by a belt 145; but it may be continuously rotated by any other desired means, as convenience may suggest.

As shown in Fig. 1, lever 51 is provided near its upper end with screws 146 147 and with a knob or handle 148, by which it may be manually operated when it is desirable to operate the valve controlling the indexing devices otherwise than automatically.

Operation: A tool-blank the ribs or lands of which are to be relieved is placed between the centers 12 and 100 and is connected with the disk 86 by means of the dog 90, arm 88, and spring 89, and the slide 142 is then adjusted to bring the grinding-disk 138 or other relieving-tool into position to operate upon said blank. Power is then applied to pulley 122 to rotate the shaft 123, which through its eccentrics 124 and 126 and the straps 127 129, surrounding the same, oscillates the tubular shaft 10 of head-stock 5 and the shaft 92 of tail-stock 8, said shafts being connected to the heads in which the slides carrying the centers are mounted, as above described. Carriage 2 is now set in operation by power transmitted to the shaft 75 by the gearing shown in Figs. 2 and 24, and this carriage and the devices for supporting, oscillating, and indexing the blank carried thereby are reciprocated to cause one of the lands of said blank to be advanced along the edge of the relieving-tool. To insure the proper relief of the lands, the centers supporting the ribbed or fluted blank must be in such position that said blank will be rocked or oscillated on an axis eccentric to the working edge of the relieving-tool, and any required degree of "relief" may be imparted to said lands by adjusting the slides 11 and 95 by means of the screws 133 and 135, an exact adjustment of said slides to the same point being rendered possible by setting the verniers 137, as above stated.

As will be noticed, the blank 91 is supported between the spring-actuated or "pump-center" 100 and the head-center 12, and it rocks or oscillates with these centers when power is applied to the shaft carrying the eccentrics to cause them to actuate the tubular shaft 10 and the shaft 92, the centers being, as before stated, carried by the slides 11 and 95. When said centers are thus oscillated, the indexing mechanism and the chamber 16 of course rock with them, and the blank is oscillated to cause the land or rib thereof to swing downward against the edge of the grinding-disk or other relieving-tool employed. This rocking action of the blank is continuous until all of its lands have been relieved, and when one land has been finished it is necessary to index the blank and bring another one into position, and this is accomplished in the following manner:

As before stated, the indexing mechanism is preferably actuated by compressed air, the supply of which to the chamber 16 is controlled by the valve 35, and it is therefore necessary to actuate the said valve from its normal closed position (shown in Fig. 12) to a position where its passage 37 and ports 37' 37² will communicate with the port 33, leading to supply-pipe 34, and with the port 31, nipple 30, and flexible pipe 27, and said valve must be moved against the pressure of the spring 40' at the termination of each reciprocatory movement of the carriage 2. To accomplish this result automatically when the carriage is moving toward the left and to reverse the movement of said carriage, the screw 46 of stop-bracket 44 comes into contact with the head of screw 146, projecting from lever 51, rocks said lever, and through the connections above described and shown in Figs. 24 and 25 releases the detent 59 and permits the clutch to be shifted to the reversing position. (Shown in Fig. 24.) Simultaneously with this action the end of pin 45, Fig. 14, will come into contact with the lever 41 above its pivot, thereby causing said lever to pull the valve-rod 40 toward the right, and thus bring the valve 35 to its open position against the pressure of spring 40', when the pressure fluid will rush through the pipe 27, enter the chamber 16 and, impinging against the wing 15² of sleeve 15, will rock said sleeve and the shaft 13, to which it is secured, toward the left in Fig. 9 until the further progress thereof is arrested by the end of stop-screw 52. As the shaft 13 rocks the crank 14, Figs. 4 and 5, turns with it and actuates the wrist-pin 77², thereby turning the crank-sleeve 77 and the plate 80, attached thereto, thus actuating the friction-disks 84 and 86, and through the connections 88 89 and dog 90 turning or indexing the blank to the desired extent, governed by said stop-screw 52. As the blank is thus turned upon its centers the land thereof next to be relieved passes the spring-plate 111 of head 110, and said plate immediately snaps behind the same. This is important for accurate indexing, for should the blank be turned too far the spring 120 will through the connections described and immediately subsequent to the closure of the valve 35 reverse the motion of said blank until the next land to be relieved is brought against said plate, as shown in Fig. 11. This action of course reverses the motion of the shaft 13 and the parts actuated by the crank 14; but the friction-disk 86 remains stationary, it being locked to the blank by the dog 90, while the other parts mentioned are permitted to return to their normal positions in virtue of the frictional connections described.

As thus far described, the carriage has completed its longitudinal movement toward the left and after the indexing of the blank has started on its return toward the right, and as it reaches the limit of said return movement, determined by the position in which the stop-bracket 44' is set, the screw 49 of said bracket will strike the screw 147, projecting from lever 51, thereby rocking said lever, the shaft 50, and parts connected thereto, and releasing the detent 60, permitting the clutch 67 to be shifted to the left in Fig. 24 and the mechanism hereinbefore described to again start the carriage 2. Simultaneously with the engagement of the screws 49 and 147 the rod 48 comes into contact with lever 41 below its pivot, thereby again forcing the lower arm of said lever toward the right and actuating the valve 35 in the manner above stated. In this way the blank is automatically indexed at the termination of movement of the carriage, and this action continues until all of the lands thereof are relieved, one land being completed at the termination of the movement of carriage 2 toward the left, the blank then being indexed and another land relieved as said carriage returns toward the right, and so on until the tool-blank between the centers is finished.

At times, owing to slight irregularities in the teeth of a blank, it is impossible to index the same properly by means extraneous of the blank itself, and it therefore becomes important to bring each tooth or rib of the blank to the exact position required for precision-ized indexing. In my invention by first overindexing a blank and then bringing it back automatically until a tooth engages a stop accurate indexing from the blank is the result, and an imperfectly-formed tooth, if such exists, can be dressed to true shape by the grinding-disk or other instrumentality employed for the purpose.

To the best of my information and belief means for first indexing a blank and then automatically retracting it against a stop, so that accurate indexing from the blank is accomplished, are broadly new, and in this respect my invention is not limited to any special machine nor to the indexing of any particular kinds of toothed and fluted tools.

It is distinctly to be understood that my invention is not limited to the precise devices shown and described for indexing work, nor is it limited to any particular mechanism for reciprocating the carriage nor to any specific stop devices mounted on said carriage.

Instead of being arranged as described the parts may be differently disposed, and they may be located in other ways than in the manner shown without departure from the invention.

No claim is made to the mechanism for rocking the blank upon its center during the operation of the relieving-tool upon the lands thereof, for such mechanism constitutes the subject-matter of my application filed August 25, 1902, Serial No. 120,954.

Having thus described my invention, what I claim is—

1. The combination, with means for supporting work, of mechanism for indexing said work; a stop bearing against the work; and means for automatically retracting the indexing mechanism and thereby forcing the work against said stop.

2. The combination, with means for supporting toothed work, of a stop; mechanism for indexing the work; and means for automatically actuating said indexing mechanism to force a tooth of the work against said stop.

3. The combination, with centers for supporting a toothed blank, of mechanism for indexing said blank upon the centers; a stop; and means for automatically retracting the indexing mechanism until further movement of the work is resisted by the engagement of a tooth thereof with said stop.

4. The combination, with means for supporting toothed work, of indexing mechanism involving a yielding element connected with the work; means for actuating said indexing mechanism; means for automatically retracting said indexing mechanism; and a stop against which a tooth of the work is forced by said retracting means.

5. The combination with head and tail stocks, of centers for supporting work carried by said stocks; a chamber; a device within said chamber; means controlled by said device for indexing the work; means for supplying fluid to said chamber; a stop; and means for automatically forcing the work against said stop.

6. The combination, with means for supporting work, of a yielding stop; devices actuated by fluid-pressure for indexing the work; and means for automatically retracting said devices to force the work against the stop should it have been carried beyond its proper place by said indexing devices.

7. The combination, with means for supporting toothed work, of a fluid-receiving chamber; a device actuated by fluid when supplied to said chamber; means controlled by said device for indexing the work; a stop; and means for automatically returning the work until a tooth thereof engages said stop.

8. The combination, with a fluid-receiving chamber, of a piston mounted in said chamber; means for supporting work; a shaft to which the piston is secured; frictional indexing devices actuated by said shaft; means for connecting one of said indexing devices with the work; a stop; and means for retracting the piston and said indexing devices until the work engages said stop.

9. The combination, with a fluid-receiving chamber, of means for supplying fluid under pressure to said chamber; a piston within the chamber; means for supporting toothed work; means controlled by the piston for indexing the work; a stop; and means for retracting the piston and the means it controls until a tooth of the work is forced against the stop.

10. The combination, with a fluid-receiving chamber, of means for supplying fluid under pressure to said chamber; a piston within said chamber; means for supporting work; means, involving a friction element, controlled by the piston for indexing said work; a stop; and means for forcing the work against said stop.

11. The combination, with a fluid-receiving chamber, of a piston within said chamber; means for supplying fluid to the chamber to actuate the piston in one direction; a valve for controlling the fluid-supply; a spring for returning the piston when the valve is actuated to shut off the supply; means for supporting work; mechanism controlled by the piston for indexing the work; means for connecting the indexing mechanism with the work; and a stop with which the work engages.

12. The combination, with a fluid-receiving chamber, of an oscillatory piston mounted in said chamber; means for supplying fluid to the chamber to actuate the piston in one direction; a valve for controlling the fluid-supply; means independent of the fluid-supply for actuating said valve; means independent of the fluid-supply for returning the piston when the valve is actuated to shut off said supply; and mechanism for indexing the work controlled by the piston.

13. The combination, with means for supporting a toothed blank, of means controlled by fluid-pressure for indexing said blank; a yielding stop for insuring accurate indexing; and means for automatically retracting said indexing mechanism, to cause a tooth of the blank to be forced against said stop.

14. The combination with means for supporting work, of indexing mechanism; means for actuating said mechanism; means for automatically retracting said mechanism; and a yielding stop-finger against which the work is forced when the indexing mechanism is retracted.

15. The combination, with means for supporting work, of indexing mechanism; means for actuating said mechanism; means for automatically retracting said mechanism; a stop against which the blank is forced when the indexing mechanism is retracted; and a yielding device carrying said stop.

16. The combination, with means for supporting work, of indexing mechanism; means for actuating said mechanism; means for retracting said mechanism; a yielding rod; and a yielding stop carried by said rod, and against which the blank is forced when said indexing mechanism is retracted.

17. The combination, with indexing mechanism, of a chamber; an oscillatory piston in the chamber; means for supplying fluid under pressure to said chamber; a shaft carrying the piston; a crank on the shaft; and means for connecting said crank with the indexing mechanism.

18. The combination, with indexing mechanism including a frictionally-actuated disk, of means for supporting work; means for connecting said disk directly with the work; a shaft; means for oscillating said shaft; means for connecting the shaft with the indexing mechanism; and a stop against which the work is forced when the shaft is retracted.

19. The combination, with a head, of a slide mounted in said head and having a slot; a center secured to said slide; a sleeve loosely mounted on the center and having a wrist-pin passing through the slot of the slide; a crank adapted to engage said wrist-pin; a shaft from which the crank projects; means for oscillating the shaft; and indexing mechanism carried by the oscillatory sleeve.

20. The combination, with a head, of a slotted slide adjustable in said head; a center projecting from the sleeve; a sleeve loosely mounted on the center and having a wrist-pin entering the slot of the slide; means for engaging the wrist-pin to thereby oscillate the sleeve; and indexing mechanism carried by the sleeve.

21. The combination, with a support, of a slotted slide mounted in a guideway of said support; a center projecting from the slide; a sleeve oscillatory on said center, and having a wrist-pin passing through the slot of the slide; a crank for engaging said wrist-pin; means for oscillating the crank; and indexing mechanism carried by the slide.

22. The combination, with centers for supporting work, of slides carrying said centers; heads in which said slides are adjustable; a sleeve mounted upon one of the centers; means for oscillating said sleeve; and indexing mechanism carried by the sleeve.

23. The combination, with centers, of supports having guideways; slides carrying the centers, and mounted in said guideways; an oscillatory sleeve mounted on one of the centers; and indexing mechanism controlled by said sleeve.

24. The combination, with centers, of a sleeve mounted on one of said centers; frictionally-controlled, indexing devices carried by the sleeve; means for oscillating the sleeve; and a device operated by fluid-pressure for actuating the sleeve-oscillating means.

25. The combination, with centers, of a sleeve mounted on one of said centers; indexing devices mounted on the sleeve; means for actuating said sleeve; a chamber; a piston in said chamber; means for supplying fluid under pressure to said chamber; a valve in the fluid-supply connection; and means for automatically actuating said valve.

26. The combination, with centers, of a pair of oscillatory heads for supporting said centers; a chamber; a shaft projecting from one of the heads; a piston secured to said shaft, and mounted in the chamber; means for supplying fluid under pressure to said chamber to actuate the piston and shaft to which it is secured in one direction; a valve for controlling the supply of fluid to said chamber; means for actuating the valve; means for returning the piston to normal position when the valve is actuated to shut off the supply of pressure fluid; and indexing mechanism carried by one of the centers, and controlled by the shaft to which said piston is secured.

27. The combination, with a pair of opposing heads, of slides adjustable on said heads; centers carried by the slides; indexing mechanism arranged to operate on work carried by said centers; means for actuating said indexing mechanism; a stop for preventing overindexing of the work; and means for automatically retracting the work against said stop.

28. The combination, with a reciprocatory carriage, of a pair of opposing heads mounted on said carriage; work-supporting centers carried by the heads; indexing mechanism arranged to operate on work carried by said centers; stops on the carriage; and means controlled by the stops for actuating said mechanism.

29. The combination, with a reciprocatory carriage, of stops adjustably secured to said carriage; a pivoted lever; a valve connected to said lever and actuated in the same direction by the stops at the termination of each stroke of the carriage; a valve-chamber; means for supplying fluid under pressure to said chamber; means for supporting work; and means controlled by the valve for indexing said work.

30. The combination, with a reciprocatory carriage, of brackets secured to said carriage; stops carried by said brackets; a lever pivoted to the frame, and adapted to be engaged by one of said stops at a point above its pivot and by the other stop at a point below said pivot; a valve connected to the lever; a valve-chamber; means for supplying fluid under pressure to the valve-chamber; means for supporting work; and indexing mechanism controlled by the valve.

31. The combination, with a reciprocatory carriage, of means for reciprocating said carriage; a pair of stop-brackets adjustably secured to the carriage; a lever; means controlled by the lever for actuating the carriage; stops mounted on the stop-brackets, and adapted to actuate said lever at the termination of each stroke of the carriage; stop-pins also carried by the stop-brackets; and indexing mechanism controlled by the stop-pins.

32. The combination, with a reciprocatory carriage, of a support mounted on said carriage; means for rocking the support; indexing mechanism carried by said support; means for actuating said mechanism by pneumatic pressure; a valve-chamber; a valve in said chamber; a flexible connection between said valve-chamber and the pneumatic indexing mechanism; and means for actuating the valve.

33. The combination, with a reciprocatory carriage, of head and tail stocks mounted on said carriage; a chamber carried by one of said stocks; a valve-chamber; a flexible connection between said valve and stock chambers; a valve; means for actuating the valve; means for supplying fluid under pressure to the valve-chamber; indexing mechanism; a rocking support for said indexing mechanism; a piston mounted in the stock-chamber; and means for connecting said piston with the indexing mechanism.

34. The combination, with a reciprocatory carriage, of a head-stock mounted on said carriage; a chamber carried by the head-stock; yielding means for supplying fluid under pressure to said chamber; a piston in said chamber; a shaft connected to said piston; indexing mechanism controlled by said shaft; a rocking support for said indexing mechanism; a valve; means for supplying fluid under pressure to said valve; and means for actuating the valve.

35. The combination, with a reciprocatory carriage, of a head-stock mounted on said carriage; a chamber carried by said head-stock; a piston in said chamber; a flexible connection for supplying fluid under pressure to said chamber; a shaft connected to the piston; indexing mechanism controlled by the shaft and carried by the head-stock; a rocking support for said indexing mechanism; a valve-chamber; a valve in said valve-chamber; means for automatically actuating said valve; and means for supplying fluid under pressure to said valve-chamber.

36. The combination, with a reciprocatory carriage, of a head-stock mounted on said carriage; a tail-stock also mounted on said carriage; centers mounted on the head and tail stocks; indexing mechanism carried by the head-stock; means for rocking said indexing mechanism; a fluid-chamber carried by the head-stock; a piston in said fluid-chamber; a shaft connected to the piston and controlling the movement of the indexing mechanism; a flexible connection to the piston-chamber; a valve-chamber communicating with said flexible connection; a valve in said chamber; means for supplying fluid under pressure to said valve-chamber; and means for actuating the valve.

37. The combination, with a reciprocatory carriage, of head and tail stocks mounted on said carriage; a piston-chamber carried by the head-stock; a piston in said chamber; a shaft to which the piston is secured; a shaft-support; means for rocking said shaft-support; indexing mechanism controlled by said shaft; a valve-chamber; a flexible connection between the valve-chamber and the piston-chamber; a valve; and means for actuating said valve.

38. The combination, with a reciprocatory carriage, of head and tail stocks adjustably secured to said carriage; centers carried by said stocks; a piston-chamber carried by the head-stock; a piston in said piston-chamber; a shaft connected to the piston; a sleeve loose on the head-stock center; frictionally-controlled indexing devices movable on said sleeve; means for connecting the shaft and sleeve; a pipe for supplying fluid to the piston-chamber; a valve-chamber with which said pipe communicates; and a valve in said valve-chamber.

39. The combination, with a reciprocatory carriage, of oscillatory means for supporting work mounted on said carriage; indexing mechanism; a piston-chamber; a piston; means for connecting the piston with said indexing mechanism; a flexible pipe leading to the piston-chamber; means for supplying fluid under pressure to said pipe, to actuate the piston in one direction; and a spring for actuating said piston in the opposite direction.

40. The combination, with a reciprocatory carriage, of a frame upon which said carriage is movable; a stationary valve-chamber; a pipe connected to the valve-chamber, and leading to a source of fluid-pressure; a valve in the valve-chamber; means for positively actuating the valve to cause communication between the valve-chamber and the fluid-supply pipe; head and tail stocks mounted on the carriage; a piston-chamber carried by the head-stock; a connection between said chambers; an oscillatory piston mounted in the piston-chamber; a shaft to which said piston is secured; indexing mechanism carried by the head-stock; and means for connecting the shaft with said indexing mechanism.

41. The combination, with head and tail stocks, of indexing mechanism; a slide mounted in a guideway of one of said stocks; a yielding rod carried by the slide; and a stop-finger secured to the rod.

42. The combination, with head and tail stocks, of indexing mechanism carried by one of said stocks; a slide adjustably mounted with relation to the other stock; said slide having a head provided with a bearing; a yielding rod mounted in said bearing; and a stop-finger projecting from one end of said rod.

43. The combination, with means for supporting work, of indexing mechanism; means for advancing said mechanism; means for retracting said mechanism; a spring-controlled rod; a support for said rod; and a stop carried by the rod, and against which the work is forced by the indexing mechanism.

44. The combination, with framework, of a reciprocatory carriage; brackets adjustably secured to said carriage; a pair of stops secured to each bracket; means for reciprocating the carriage controlled by one member of each pair of said stops; indexing mechanism; and means for actuating said mechanism controlled by the other member of each pair of said stops.

45. In mechanism for indexing fluted blanks, the combination, with head and tail stocks, of work-supporting centers carried by said stocks; indexing devices carried by the head-stock; means for actuating said devices by fluid-pressure in one direction; means for retracting said devices under yielding pressure; and a resilient stop against which the fluted blank is forced upon the retraction of said indexing devices.

46. In indexing mechanism, the combination, with a support, of a crank-sleeve mounted on said support; means for oscillating said crank-sleeve; a carrier on the sleeve; frictional devices mounted on said carrier; and means for connecting one of said devices with the device to be indexed.

47. In indexing mechanism, the combination, with a support, of an oscillatory sleeve mounted on said support; a carrier secured to said sleeve; frictional devices carried by the carrier; and means for connecting one of said devices with the article to be indexed.

48. In indexing mechanism, the combination, with a support, of a sleeve loosely surrounding said support, said sleeve carrying a wrist-pin; a crank engaging said wrist-pin; means for actuating the crank; a carrier secured to the sleeve; frictional devices mounted on the carrier; and means for connecting one of said devices with the article to be indexed.

49. In indexing mechanism, the combination, with a support, of a sleeve loosely surrounding said support, said sleeve having a wrist-pin; a crank in engagement with said wrist-pin; a crank-shaft; means for actuating said crank-shaft; friction elements actuated by the sleeve; and means for connecting one of said friction elements with the device to be indexed.

50. In indexing mechanism, the combination, with a support, of an oscillatory sleeve loose upon said support; a friction element controlled by the sleeve; and a device for indexing an article carried by said friction element.

51. In indexing mechanism, the combination, with a pair of friction-disks, of a device for supporting said disks; a sleeve to which the disk-supporting device is secured; means for actuating the sleeve; and means for connecting one of the friction-disks with a device to be indexed.

52. In indexing mechanism, the combination, with centers, of a sleeve loosely mounted on one of said centers; a carrier secured to the sleeve; a pair of friction-disks mounted on the carrier; a clamp secured to one of said friction-disks; and means for oscillating the sleeve.

53. In indexing mechanism, the combination, with centers, of a sleeve loosely mounted on one of said centers; a support to which the center is secured, a carrier; means for fastening said carrier to the sleeve; frictional devices mounted on the carrier; means carried by one of said frictional devices for engaging a device to be indexed; and means for oscillating the sleeve.

54. In indexing mechanism, the combination, with centers, of a sleeve loosely mounted on one of said centers; a support, said support carrying the center upon which the sleeve is mounted; means for oscillating the sleeve; a flanged plate secured to the sleeve; a spring mounted on said plate; a friction-disk against which said spring bears, said disk being connected to the base of the flanged plate; a second friction-disk; and a clamp carried by said second friction-disk.

In testimony whereof I affix my signature in presence of two witnesses.

FRANCIS G. ECHOLS.

Witnesses:
E. D. CLARK,
W. N. LARKUM.